Nov. 1, 1960 R. N. JANEWAY 2,958,542
TRACTOR-TRAILER FIFTH WHEEL CONNECTION
Filed June 2, 1958 2 Sheets-Sheet 1
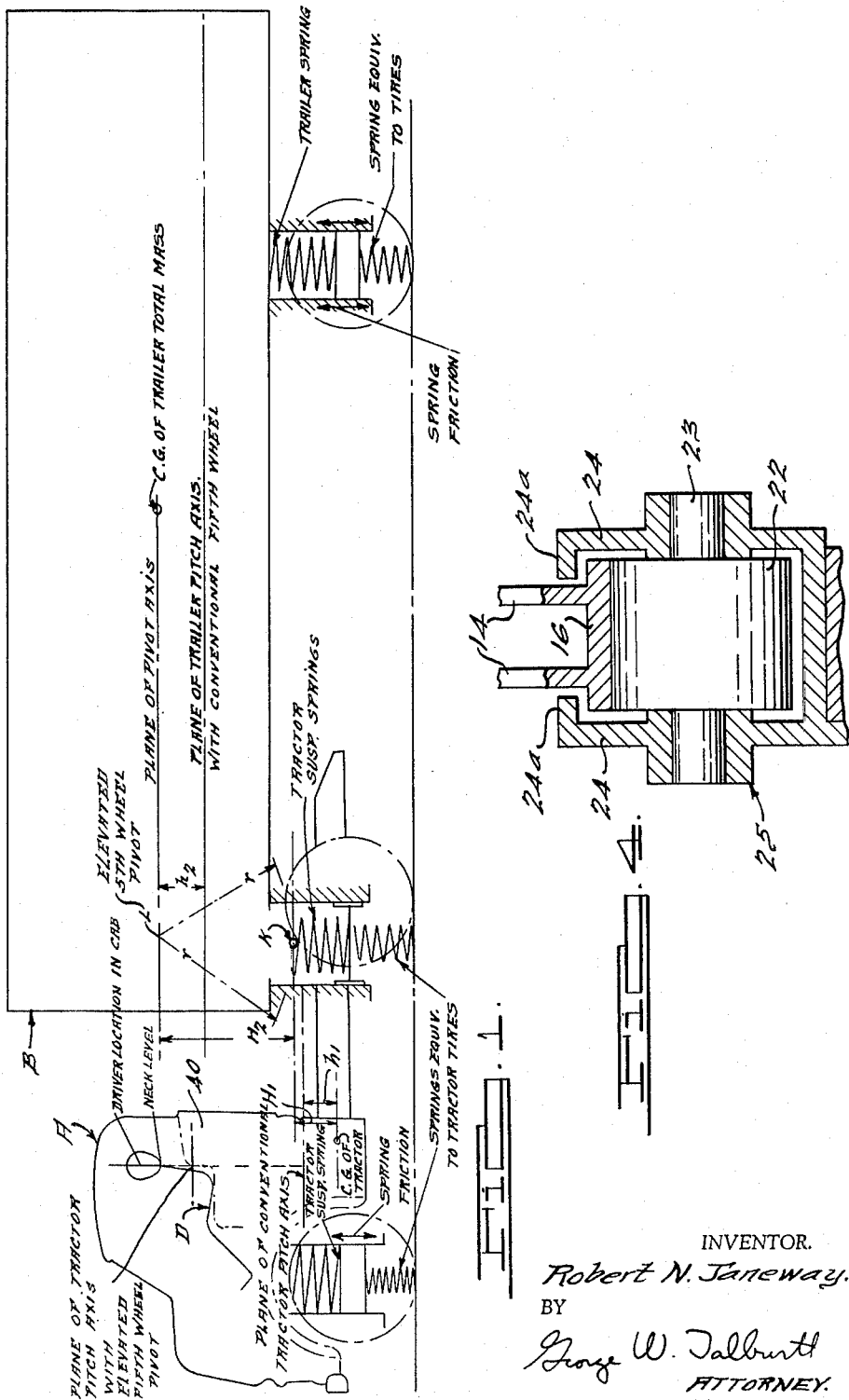
INVENTOR.
Robert N. Janeway.
BY
George W. Talburtt
ATTORNEY.

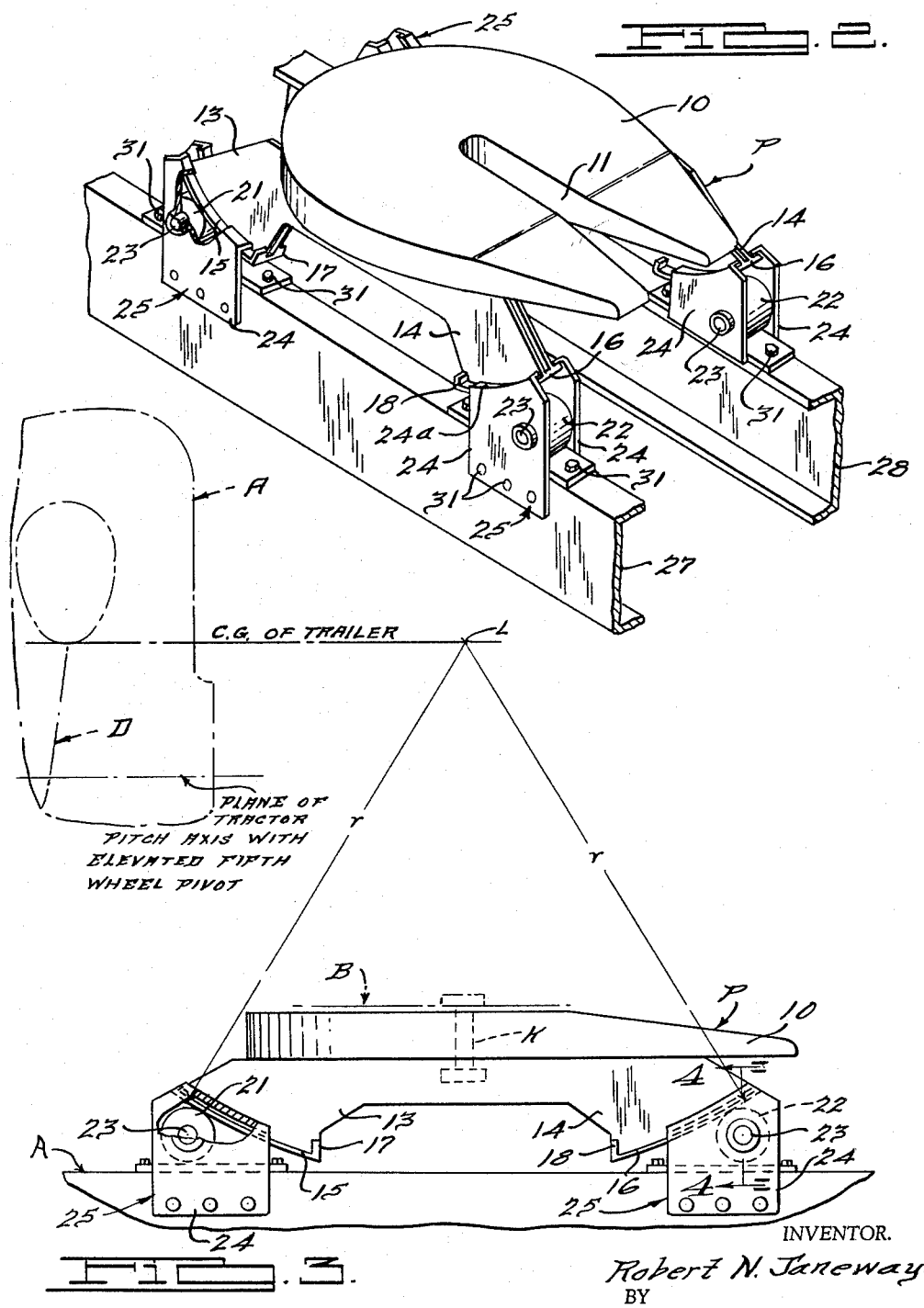

United States Patent Office 2,958,542
Patented Nov. 1, 1960

2,958,542

TRACTOR-TRAILER FIFTH WHEEL CONNECTION

Robert N. Janeway, 8120 E. Jefferson, Detroit, Mich.

Filed June 2, 1958, Ser. No. 739,028

11 Claims. (Cl. 280—438)

This application relates to tractor-trailer fifth wheel connections and particularly to a friction free fifth wheel connection that elevates the effective horizontal pivot axis of the fifth wheel connection to a position where the fore and aft motion transmitted to the tractor operator is greatly reduced.

It is a prime object of this invention to provide a tractor-trailer fifth wheel connection that elevates the effective pivot axis of the fifth wheel to a location above the tractor chassis closely adjacent the horizontal plane of the trailer center of gravity.

It is still another object of this invention to provide a tractor-trailer fifth wheel connection that tends to prevent the pitching motion of the trailer from transmitting fore and aft disturbances to the tractor.

It is still another object of this invention to provide a tractor-trailer fifth wheel pivot connection that permits limited relative oscillatory movement between the tractor and trailer on substantially friction free, shiftably engaged, elements of the tractor and trailer having an effective axis of oscillation located in an elevated horizontal plane approaching the level of the neck of the tractor operator.

Fig. 1 is a diagrammatic side elevational view of a tractor-trailer combination with appropriate notations and reference lines applied to show the locations of certain forces that act upon the connected vehicles and the operator;

Fig. 2 is a fragmentary perspective view of the tractor-mounted fifth wheel assembly that embodies a preferred form of this invention;

Fig. 3 is a side elevational view of the fifth wheel assembly shown in Fig. 2, portions of the assembly being broken away and shown in section for the sake of clarity; and Fig. 4 is an enlarged sectional elevational view of one of the friction free pivot supports for the tractor mounted fifth wheel assembly, the view being taken along the line 4—4 of Fig. 3.

The dynamic reactions between tractor and trailer are one of the least understood phases of the commercial vehicle ride problem. Several possible sources of tractor disturbance, resulting from its coupling to the trailer, are recognized. The difficulty arises in evaluating their relative importance. The known or suspected factors in the tractor-trailer combination, responsible for detrimental effects on the tractor ride, are the following:

(a) The low pitch axis location of the tractor, resulting from the method of applying the trailer load.

(b) Dynamic reactions from transient longitudinal forces acting on the trailer.

(c) Dynamic reactions from pitching oscillations of the trailer.

In heretofore conventional tractor-trailer fifth wheel connections the type of coupling used results in the pitch axis of the tractor being located between the fifth wheel king pin connection and the tractor center of gravity (C.G.). We know from tests that the combination of high tractor operator position and low tractor pitch axis is the cause of the aggravating fore and aft disturbances that are transmitted to the operator. Accordingly, improvement of this situation can be attained by providing a practical means of raising the tractor pitch axis. Calculations and tests have shown that the fore and aft accelerations at the tractor operator's neck would be reduced twenty percent (20%) for every foot that the tractor pitch axis is raised above the theoretical pitch axis of a conventional tractor.

Now let's take the case of our two masses, tractor and trailer, coupled by a conventional fifth wheel, and neglect the longitudinal locations of the pitching axes. Since we are concerned primarily with the longitudinal disturbance, we can confine our analysis to the vertical locations of these axes. Considering first, the conventional tractor, if it were to pitch about an axis at its C.G. level, the king pin K of the conventional fifth wheel pivot being higher than the tractor C.G. would be forced to oscillate longitudinally and introduce longitudinal inertia forces at the trailer C.G. These forces would, in turn, react on the conventional fifth wheel connection, accelerating the tractor C.G. longitudinally. The upshot of this interaction is that actually an intermediate pitch axis is established between the conventional fifth wheel pivot and the tractor C.G. about which both points oscillate longitudinally. It is pretty clear that this null point (at the tractor pitch axis) must be located so that the vertical distances to the tractor C.G. and to the fifth wheel pivot are, respectively, close to the same ratio as the trailer mass is to the tractor mass. The location of the plane of the tractor pitch axis can be determined from the formula:

$$h_1 = \frac{H_1}{1 + \frac{m}{M}}$$

where $h_1$ = vertical distance between tractor C.G. and tractor pitch axis.
$H_1$ = vertical distance between tractor-trailer fifth wheel pivot axis and tractor C.G.
$M$ = trailer total mass.
$m$ = tractor total mass.

This means that the tractor pitch axis is much closer to the fifth wheel pivot than to the tractor C.G. with a loaded trailer. Therefore, in general, the higher the fifth wheel pivot, the higher is the tractor pitch axis and the shorter the distance to the driver's body and the less this longitudinal disturbance from the pitch of the tractor.

Now, consider the longitudinal reaction on the tractor from pitch of the trailer. Here, in the same way, the trailer pitching axis will end up at a height such that the vertical distances to fifth wheel pivot and trailer C.G. are respectively, in the same ratio as trailer mass to tractor mass, or much closer to the trailer C.G. level than to the fifth wheel. As a result, the fifth wheel and tractor longitudinal accelerations are multiplied up to about four times that of the trailer C.G. for that is about the maximum ratio of loaded trailer mass to tractor mass. The longitudinal acceleration induced by the trailer pitch is probably of the same order as that produced directly by the pitch of the tractor. Since both actions can take place simultaneously the two independent accelerations can add or subtract depending on their phase relation. It is easy to account for maximum longitudinals of 60 to 70% g which can be sustained on poor roads or under resonance conditions on concrete joints.

The next question is—where should the fifth wheel pivot be for optimum results? Well, let's see what happens when we lower the pivot to the tractor C.G. level. Now the tractor can pitch freely without inducing any longitudinal force at the pivot. This is fine for the trailer but the driver is now higher above the axis and his direct longitudinal acceleration is proportionately greater by about 25%. The pitching frequency will also be somewhat higher because of a smaller moment of inertia. Furthermore, we have now increased the vertical distance from the fifth wheel pivot to the trailer C.G. so that the trailer pitching axis is lowered, increasing the longitudinal acceleration both on the tractor and trailer about 30% for the same angular acceleration. The overall result is a cumulative loss so far as driver comfort is concerned.

It follows that the fifth wheel pivot should be raised—but how much? Well, one thing is immediately apparent—if we raise the effective pivot to the level of the trailer C.G. there will be no induced longitudinal force from pitching of the trailer to react on the tractor. That will completely eliminate one major source of disturbance. The next point to consider is the effect on the direct pitch of the tractor. Applying analytical results, we find that the pitching axis will fall about 7 ft. above ground or about 1 ft. below the trailer C.G. This should be close to the driver's neck level or just about where we want it for minimum longitudinal discomfort. An extra benefit will accrue from this move. The high elevation of the pitching axis will result in a considerable increase in effective moment of inertia of the tractor with corresponding reduction in pitching frequency and accelerations.

The theoretical pitch axis of the conventional trailer, as previously explained, is located vertically between the trailer center of gravity (C.G.) and the fifth wheel transverse pivot. The location of the plane of the trailer pitch axis (see Fig. 1) can be determined from the formula:

$$h_2 = \frac{H_2}{1+\frac{M}{m}}$$

where $h_2$ = vertical distance between trailer C.G. and trailer pitch axis.
$H_2$ = vertical distance between tractor-trailer fifth wheel pivot axis and trailer C.G.
$M$ = trailer total mass.
$m$ = tractor total mass.

From this formula it will be noted that the vertical distances from the trailer pitch axis, respectively, to the fifth wheel pivot axis and to the trailer center of gravity (C.G.) are in the ratio of the trailer mass to the tractor mass.

Since the longitudinal force at the fifth wheel kingpin is equal to the inertia force at the trailer center of gravity the ratio of tractor acceleration to that of the trailer C.G. is equal to the ratio of trailer mass to tractor mass. This means that the longitudinal tractor acceleration is usually from 2.5 to 4.0 times greater than the acceleration of the trailer C.G. due to its pitching oscillation. Analysis shows that longitudinal accelerations so imposed on the tractor from the trailer and superimposed on the direct disturbance of the tractor accounts for the intense fore and aft surgings experienced by the tractor operator when traversing severe road bumps.

The conclusions drawn from the preceding analysis point unmistakably to the desirability of raising the effective 5th wheel pivot axis. This would be a positive approach to reducing both sources of excessive fore and aft disturbances to the driver (1) By raising the tractor pitch axis.
(2) By reducing the distance from the fifth wheel pivot to the trailer pitch axis.

Of course it would hardly be practical to raise the fifth wheel pivot literally up into the trailer. However, it appears to be possible to obtain a virtual pivot axis which is elevated into the trailer and still provide an improved, workable, fifth wheel construction.

Now considering Figs. 1 and 3 of the drawings it will be noted that A represents a tractor of the cab-over-engine (COE) type that has an operator D schematically shown seated in the seat in the tractor cab. The tractor A is drivingly connected to a trailer B by means of a kingpin K that forms part of an elevated pivot fifth wheel connection P shown in detail in Figs. 2–4. This fifth wheel connection P comprises a skid plate 10 having a segmental slot 11 therein to receive the trailer kingpin K (see Fig. 3). Skid plate 10 has pairs of legs 13 and 14 depending from the front and rear ends respectively of the plate 10 at each side thereof. Legs 13 and 14 may be of single or double walled construction as shown and they carry on their lower edges arcuate downwardly facing, convex, roller bearing surfaces 15 and 16 respectively. The inwardly disposed ends 17 and 18 of the roller bearing surfaces 15 and 16 are turned up to provide stop means that will subsequently have their function described.

The four legs 13, 13 and 14, 14 of the skid plate 10 are adapted to be supported on the two pairs of friction free rollers 21 and 22 respectively by the aforementioned roller bearing surfaces 15 and 16. The rollers 21, 22 each have a horizontally extending pivot pin 23 that is supported by the spaced apart legs 24 of an associated support bracket 25. The two pairs of brackets 25 are seated on and bolted to the tops of the side rails 27, 28 of the associated tractor chassis frame. The outside wall 24 of the brackets 25 may be extended downwardly so that they will each provide a portion to lay flush against the outside of the associated chassis frame rail 27 or 28. The flanged brackets 25 provide an installation unit that is very economical, easy to install, and very rigid.

The curvature of the roller bearing surfaces 15, 16 is such that their axis of curvature L is elevated considerably above the plane of the roller pins 23 and approaches the average height of the plane of the trailer center of gravity which will vary with loadings. The radius of curvature of the elevated pivot L has been designated r in Figs. 1 and 3. It will also be noted that the axis of curvature L, which is the effective horizontal pivot axis of the fifth wheel connection P, is located closely adjacent the level of the neck of the operator D which has previously been shown to be an optimum location for minimum ride disturbance to the operator. Ideally the pivot axis for the fifth wheel should be at the elevation of the trailer center of gravity and above the driver's neck level so that the driver's neck level would be at the elevation of the trailer pitch axis. However, practical limitations such as trailer stability and dimensional limitations require some compromise with the ideal location. While the center of gravity of the trailer will vary depending on the loading, it has been found that the center of gravity of the tractor is a substantially fixed distance above the ground. Tests have shown that if the fifth wheel pivot axis L is raised to a level within the upper third of the vertical distance from the tractor center of gravity to the neck of the vehicle operator that then excellent ride results. Under such circumstances the tractor pitch axis will be elevated to the level shown based on application of the aforementioned formula:

$$h_1 = \frac{H_1}{1+\frac{m}{M}}$$

From Figs. 3 and 4, in particular, it will be noted that the trailer front end is supported on the tractor at four lines of contact between the roller bearings 15, 16 and the rollers 21, 22. This arrangement, which takes account of the stabilizing effect of the convexly curved, roller bearing surfaces 15, 16, also provides a pivotal tractor-to-trailer connection that has a minimum of friction. Accordingly, limited, relative angular movement may readily take place between the tractor and trailer so as to prevent transmission of certain longitudinally directed disturbances to the tractor operator D.

The turned up inner ends 17 and 18 of the roller bearing surfaces 15, 16 are arranged to be engageable with the adjacent ends of the associated support bracket 25. Fig. 2 is thought to clearly show that the bearing surface ends 17, 18 will engage the inturned upper ends flanges 24a when these roller bearing members 15, 16 have moved to their predetermined limits of angular oscillation.

The inturned upper flanges 24a on the bracket side walls not only provide means to limit the angular oscillation of the skid plate 10 but they also provide a friction free means that will prevent accidental disengagement of the skid plate from the chassis mounted brackets 25. From Fig. 4 it is clear that the flanges 24a overlie the side edges of the roller bearing surfaces 15, 16 so that there is no chance of the bearing surfaces 15, 16 becoming disengaged from the associated brackets 25. Brackets 25 are fixedly connected to the chassis frame side rails 27, 28 by bolts 31. It will be noted from Fig. 4 that normally the bracket flanges 24a do not contact the roller bearing surfaces 16 thus there is no friction contact with the flanges 24a to interfere with the oscillatory floating action of the tractor relative to the skid plate 10.

It will be seen from the previous description of this invention that this fifth wheel pivotal action is substantially friction free so that the angular oscillatory movement of the skid plate 10 has minimum interference applied thereto. Furthermore, the effective pivot axis L for the oscillatable skid plate 10 is elevated above the skid plate to a location adjacent the level of the operator's neck which with a conventional tractor-trailer combination is very near the horizontal plane through the center of gravity of the trailer. This optimum location for the effective pivot axis for the fifth wheel connection has been proven by tests to materially reduce the ride disturbances that would otherwise be transmitted to the tractor operator. While it may not always be possible to have the center of curvature L actually at the level of the operator's neck, still, if the center of curvature is elevated sufficiently to lie in the upper third of the vertical distance between the tractor center of gravity and the operator's neck then exceptional improvement in ride for the tractor operator is achieved.

It must not be overlooked that in addition to elevating the fifth wheel axis of curvature L above the tractor skid plate 10, that this invention has also eliminated most of the friction in the fifth wheel connection. This is also very important. Friction in the fifth wheel connection gives a coupling between the trailer and the tractor that tends to lock the trailer to the tractor so that the trailer pitch tends to be transmitted to the tractor through the friction connection. That is one reason why the friction free coupling herein disclosed has proven to give such an improved ride to the tractor operator.

I claim:

1. A tractor-trailer fifth wheel connection comprising a skid plate having a segmental slot therein to receive a trailer king-pin, said skid plate having a pair of longitudinally spaced apart legs depending from said skid plate, said legs each mounting on their lower end parts a downwardly facing, convexly curved, bearing surface, a pair of longitudinally spaced apart brackets each mounting a roller means that is free to rotate about a substantially horizontally extending, transversely disposed pivot axis, said convexly curved bearing surfaces being mounted on said spaced apart roller means so that said skid plate can oscillate in a longitudinal direction on said rollers about a center of curvature located above the skid plate.

2. A tractor-tractor fifth wheel connection comprising a skid plate having a segmental slot therein to receive a trailer king-pin, said skid plate having a pair of longitudinally spaced apart legs depending from said skid plate, said legs each mounting on their lower end parts a downwardly facing, convexly curved, bearing surface, a pair of longitudinally spaced apart brackets each mounting a roller means that is free to rotate about a substantially horizontally extending, transversely disposed pivot axis, said convexly curved bearing surfaces being mounted on said spaced apart roller means so that said skid plate can oscillate in a longitudinal direction on said rollers about a center of curvature located above the skid plate, said brackets having stop means thereon engageable with said plate mounted bearing surfaces to limit the longitudinal oscillatory movement of the skid plate in opposite directions.

3. A tractor-trailer fifth wheel connection comprising a skid plate having a segmental slot therein to receive a trailer king-pin, said skid plate having a pair of longitudinally spaced apart legs depending from said skid plate, said legs each mounting on their lower end parts a downwardly facing, convexly curved, bearing surface, a pair of longitudinally spaced apart brackets each mounting a roller means that is free to rotate about a substantially horizontally extending, transversely disposed pivot axis, said convexly curved bearing surfaces being mounted on said spaced apart roller means so that said skid plate can oscillate in a longitudinal direction on said rollers about a center of curvature located above the skid plate, said brackets having stop means thereon engageable with said plate mounted bearing surfaces to limit the longitudinal oscillatory movement of the skid plate in opposite directions and additional friction free means operable to prevent accidental disengagement of said skid plate from said brackets.

4. A tractor-trailer fifth wheel connection comprising a skid plate having a segmental slot therein to receive a trailer king-pin, said skid plate having a pair of longitudinally spaced apart legs depending from said skid plate, said legs each mounting on their lower end parts a downwardly facing, convexly curved, bearing surface, a pair of longitudinally spaced apart brackets each mounting a roller means that is free to rotate about a substantially horizontally extending, transversely disposed pivot axis, said convexly curved bearing surfaces being mounted on said spaced apart roller means so that said skid plate can oscillate in a longitudinal direction on said rollers about a center of curvature located above the skid plate, said brackets having stop means thereon engageable with said plate mounted bearing surfaces to limit the longitudinal oscillatory movement of the skid plate in opposite directions and additional friction free means operable to prevent accidental disengagement of said skid plate from said brackets comprising flanges on said bracket plate engageable in overlapping relationship with portions of said roller bearing surfaces.

5. In combination with a tractor having a cab and a trailer towed thereby, a fifth wheel pivot connection drivingly connecting said tractor and trailer comprising a king-pin on said trailer and a skid plate mounted on said tractor, said skid plate including means to drivingly engage said trailer king-pin and frictionless bearing means to pivotally support said skid plate on said tractor for limited angular oscillation longitudinally thereof about a pivot axis elevated above the tractor skid plate and located at approximately the elevation of the trailer center of gravity.

6. In combination with a tractor having a cab and a trailer towed thereby, a fifth wheel pivot connection drivingly connecting said tractor and trailer comprising a king-pin on said trailer and a skid plate mounted on said tractor, said skid plate including means to drivingly engage said trailer king-pin and frictionless bearing means to pivotally support said skid plate on said tractor for limited angular oscillation longitudinally thereof about a pivot axis elevated above the tractor skid plate and located at an elevation approximately two thirds of the distance between the skid plate and the top of the tractor cab.

7. In combination with a tractor having a cab and a trailer towed thereby, a fifth wheel pivot connection drivingly connecting said tractor and trailer comprising a king-pin on said trailer and a skid plate mounted on said tractor, said skid plate including means to drivingly engage said trailer king-pin and frictionless bearing means to pivotally support said skid plate on said tractor for limited angular oscillation longitudinally thereof about a pivot axis elevated above the tractor skid plate and located at an elevation thereabove approximately three-fourths of the vertical distance between the tractor center of gravity and the top of the tractor cab.

8. In combination with a tractor having a cab and a trailer towed thereby, a fifth wheel pivot connection drivingly connecting said tractor and trailer comprising a king-pin on said trailer and a skid plate mounted on said tractor, said skid plate including means to drivingly engage said trailer king-pin and frictionless bearing means to pivotally support said skid plate on said tractor for limited angular oscillation longitudinally thereof about a pivot axis elevated a substantial distance above the tractor to permit said skid plate oscillation to nullify the transmission of trailer generated disturbances to the tractor, said bearing means comprising a downwardly facing, convexly curved, bearing support portion on said skid plate and a pair of longitudinally spaced apart, roller elements engageable with said curved support portion and arranged to permit oscillation of the skid plate about said elevated axis.

9. In combination with a tractor having a cab and a trailer towed thereby, a fifth wheel pivot connection drivingly connecting said tractor and trailer comprising a king-pin on said trailer and a skid plate mounted on said tractor, said skid plate including means to drivingly engage said trailer king-pin and means to pivotally support said skid plate on said tractor for limited angular oscillation longitudinally thereof about an axis of curvature elevated above the tractor and located in a horizontal plane adjacent the elevation of the trailer center of gravity, said skid plate having a pair of longitudinally spaced apart bearing members each mounting a downwardly facing, convexly curved, bearing surface, a pair of longitudinally spaced apart supports each mounting a roller means that is free to rotate about a substantially horizontally extending, transversely disposed pivot axis, said convexly curved bearing surfaces being mounted on said spaced apart roller means so that said skid plate can oscillate in a longitudinal direction on said rollers about said elevated axis.

10. A tractor-trailer fifth wheel connection comprising a skid plate having a slot therein to receive a trailer king-pin, said skid plate having depending portions that provide a pair of longitudinally spaced apart, downwardly facing, convexly curved, bearing surface portions, a pair of roller means adapted to supportingly engage said bearing surface portions, support means for mounting said roller means for free rotation about substantially horizontally extending, transversely disposed pivot axes, said convexly curved bearing surface portions being in rolling contact with said spaced apart roller means so that said skid plate can oscillate in a longitudinal direction on said rollers about a center of curvature located a substantial distance above the skid plate.

11. A tractor-trailer fifth wheel connection comprising a skid plate member adapted to be mounted on a tractor and connected to a trailer king pin and a skid plate supporting member adapted to be fixedly mounted on a tractor, said skid plate member being mounted on said supporting member by friction-free pivot means that permits the skid plate to oscillate longitudinally of its supporting member about an effective pivot axis located a substantial distance above the skid plate member, said pivot means comprising longitudinally spaced apart, horizontally disposed, transversely extending roller means mounted on one of said members and longitudinally extending, arcuately curved bearing portions on said other member engaged with said roller means that are shaped and arranged to guide the longitudinal oscillatory pivotal movement of said skid plate about said elevated pivot axis.

References Cited in the file of this patent

UNITED STATES PATENTS

| | | |
|---|---|---|
| 1,953,705 | Fellows | Apr. 3, 1934 |
| 2,116,027 | Kolbe | May 3, 1938 |
| 2,123,754 | Talbot | July 12, 1938 |
| 2,503,530 | Weber | Apr. 11, 1950 |
| 2,726,879 | Vaillant | Dec. 13, 1955 |
| 2,727,755 | Hume | Dec. 20, 1955 |
| 2,809,851 | Beck | Oct. 15, 1957 |
| 2,833,561 | Vaugoyeau | May 6, 1958 |